United States Patent
Erat et al.

(10) Patent No.: US 9,235,850 B1
(45) Date of Patent: Jan. 12, 2016

(54) ADAPTATION OF WEB-BASED TEXT ADS TO MOBILE DEVICES

(75) Inventors: Daniel T. Erat, San Francisco, CA (US); Joshy Joseph, Los Altos Hills, CA (US); Jennifer W. Lin, Mountain View, CA (US); Kuan-Loong Yong, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1976 days.

(21) Appl. No.: 11/838,196

(22) Filed: Aug. 13, 2007

(51) Int. Cl.
  *G06F 17/30* (2006.01)
  *G06Q 30/02* (2012.01)
  *G06F 17/22* (2006.01)

(52) U.S. Cl.
  CPC ........ *G06Q 30/0256* (2013.01); *G06F 17/2247* (2013.01)

(58) Field of Classification Search
  None
  See application file for complete search history.

(56) References Cited

U.S. PATENT DOCUMENTS

| | | |
|---|---|---|
| 5,539,395 A | 7/1996 | Buss et al. |
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,084,628 A | 7/2000 | Sawyer |
| 6,144,944 A | 11/2000 | Kurtzman, II et al. |
| 6,167,382 A | 12/2000 | Sparks et al. |
| 6,219,696 B1 | 4/2001 | Wynblatt et al. |
| 6,269,361 B1 | 7/2001 | Davis et al. |
| 6,317,781 B1 | 11/2001 | De Boor et al. |
| 6,332,127 B1 | 12/2001 | Bandera et al. |
| 6,401,075 B1 | 6/2002 | Mason et al. |
| 6,446,261 B1 | 9/2002 | Rosser |
| 6,470,381 B2 | 10/2002 | De Boor et al. |
| 6,487,538 B1 | 11/2002 | Gupta et al. |
| 6,621,892 B1 * | 9/2003 | Banister ................. H04M 3/42 379/88.14 |
| 6,647,257 B2 | 11/2003 | Owensby |
| 6,647,269 B2 | 11/2003 | Hendrey et al. |
| 6,856,673 B1 | 2/2005 | Banks et al. |
| 6,950,804 B2 | 9/2005 | Strietzel |
| 6,985,882 B1 | 1/2006 | Del Sesto |
| 6,993,326 B2 | 1/2006 | Link et al. |
| 7,027,801 B1 | 4/2006 | Hall et al. |
| 7,039,599 B2 | 5/2006 | Merriman |
| 7,136,875 B2 | 11/2006 | Anderson et al. |
| 7,548,915 B2 * | 6/2009 | Ramer et al. |
| 7,606,840 B2 * | 10/2009 | Malik ............... G06F 17/30194 |

(Continued)

FOREIGN PATENT DOCUMENTS

WO   WO 97/21183   6/1997

OTHER PUBLICATIONS

U.S. Appl. No. 95/001,073, filed Sep. 30, 2004, Reexamination of Stone et al.

(Continued)

*Primary Examiner* — Olabode Akintola
(74) *Attorney, Agent, or Firm* — Foley & Lardner LLP; John D. Lanza

(57) ABSTRACT

Systems and methods for adaptation of content to mobile devices. A mobile device type can be identified based upon a request originating from the mobile device. Content can also be identified based upon the request. The content can be converted based upon the mobile device type and the converted content can be served to the mobile device.

28 Claims, 8 Drawing Sheets

(56) References Cited

U.S. PATENT DOCUMENTS

| | | | |
|---|---|---|---|
| 7,734,556 B2 * | 6/2010 | Tan ................. | G06F 17/277 706/16 |
| 7,769,764 B2 | 8/2010 | Ramer et al. | |
| 8,219,567 B2 * | 7/2012 | Serdy, Jr. .......... | G06F 17/30613 707/748 |
| 2002/0046104 A1 | 4/2002 | Kaddeche et al. | |
| 2002/0095333 A1 | 7/2002 | Jokinen et al. | |
| 2003/0014307 A1 | 1/2003 | Heng | |
| 2004/0034561 A1 | 2/2004 | Smith | |
| 2005/0222903 A1 | 10/2005 | Buchheit et al. | |
| 2005/0251820 A1 | 11/2005 | Stefanik et al. | |
| 2005/0278743 A1 | 12/2005 | Flickinger et al. | |
| 2006/0217110 A1 | 9/2006 | Othmer | |
| 2007/0198339 A1 * | 8/2007 | Shen et al. ................ | 705/14 |
| 2007/0260635 A1 * | 11/2007 | Ramer .............. | G06F 17/30905 |
| 2008/0109285 A1 | 5/2008 | Reuther et al. | |

OTHER PUBLICATIONS

U.S. Appl. No. 95/001,061, filed Sep. 3, 2002, Reexamination of Stone et al.
U.S. Appl. No. 95/001,069, filed Jul. 11, 2002, Reexamination of Dean et al.
U.S. Appl. No. 95/001,068, filed Dec. 7, 2002, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
Office Action for U.S. Appl. No. 11/360,015, mailed Sep. 2, 2010, 16 pages.

* cited by examiner

ADAPTATION OF WEB-BASED TEXT ADS TO MOBILE DEVICES

BACKGROUND

This disclosure relates to advertising.

As the Internet has grown, online advertising has become a popular method by which advertisers can reach consumers. Online advertising provides opportunities for advertisers to target their advertisements to a receptive audience. Advertisements can be identified by one or more content servers in response to queries. The queries can, for example, include search engine queries.

Some advertising may not reach the intended target audience. For example, mobile communications devices can submit searches. However, web-based text advertisements may not format well for mobile communications devices and accordingly be displayed poorly/ineffectively if at all. Some conventional advertising systems sell mobile text advertising, however, these sales are performed independently of conventional web-based text advertising. Moreover, these conventional systems require creation of two separate advertisements if the advertiser desires to buy both mobile and web-based text advertisements because of the formatting differences between the media.

SUMMARY

Disclosed herein are systems, apparatus and methods for integration of mobile and web-based advertising. Methods for adaptation of online text ads can include: identifying a content request associated with a mobile device; classifying the mobile device type; converting one or more content items to a secondary format based upon the mobile device type; and, delivering to the mobile device one or more content items in accordance with the mobile device type.

Systems for adaptation of online text ads can include an advertisement server, a classification module and a conversion module. The advertisement server can receive a search query from a mobile device and identify any relevant web-based text ads based upon the search query. The classification module can parse the search query to determine a mobile device type associated with the mobile device. The conversion module can convert a web-based text ad based upon a format associated with the mobile device type. Upon conversion, the advertisement server can communicate the converted web-based text ad to the mobile device.

Systems and methods as described can facilitate the creation of mobile text ads and expand the marketplace for online advertising, as well as facilitate the management of a portfolio of advertisements.

DETAILED DESCRIPTION

Figure 1:
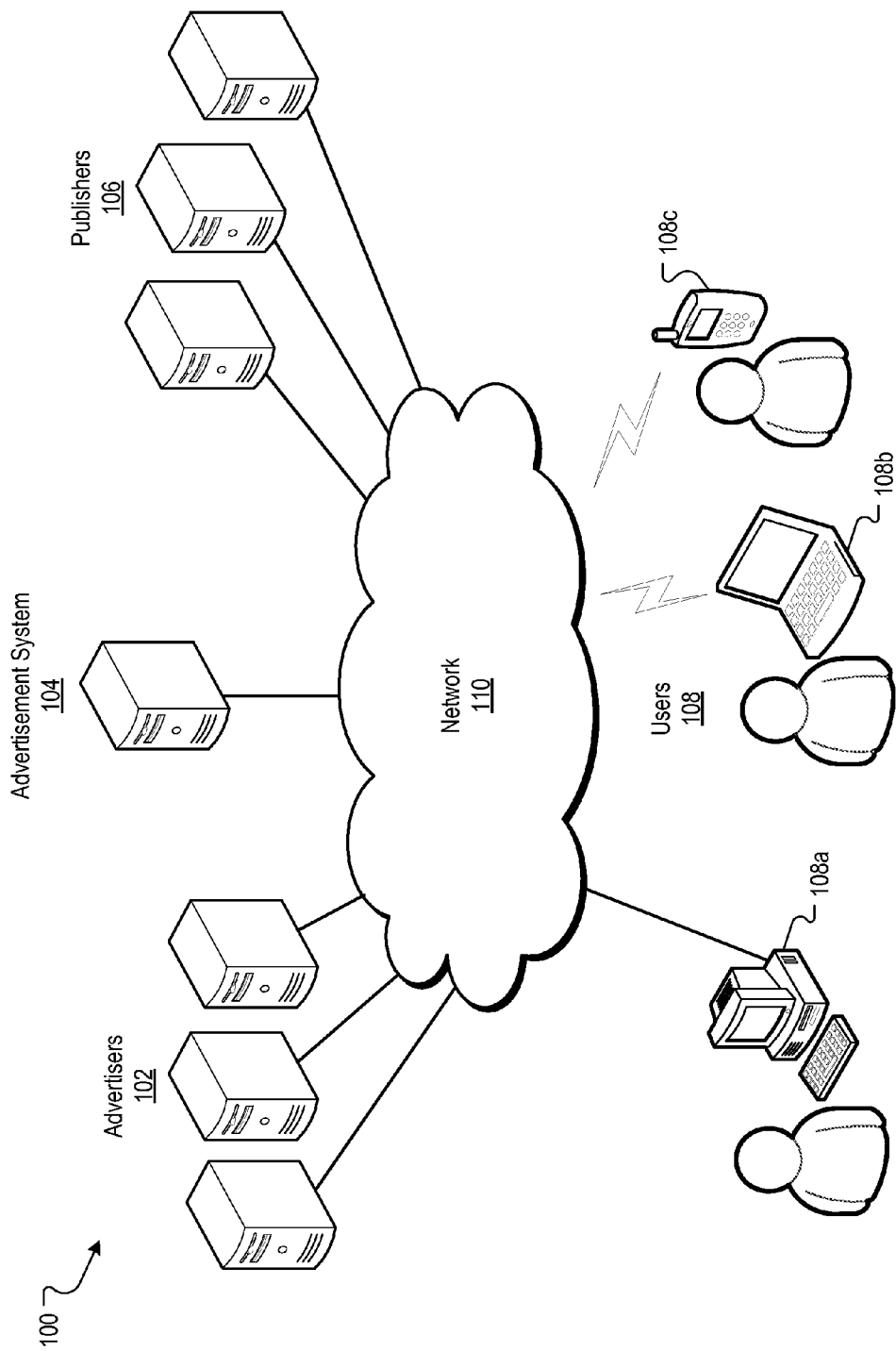
FIG. 1 is a block diagram of an implementation of an online advertising system.

FIG. 1 is a block diagram of an implementation of an online advertising system 100. A computer network 110, such as a local area network (LAN), wide area network (WAN), the Internet, or a combination thereof, connects the advertisers 102, an advertising system 104, publishers 106, and users 108.

In some implementations, one or more advertisers 102 can directly, or indirectly, enter, maintain, and track advertisement ("ad") information in an advertisement system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as links, meta-information, and/or machine executable instructions. One or more publishers 106 may submit requests for advertisements to the system 104. The system 104 responds by sending advertisements (e.g., when an associated publication is rendered) to the requesting publisher 106 for placement on one or more of the publisher's web properties (e.g., websites and other network-distributed content). While reference is made to advertisements, other content items can be provided by the system 104.

Other entities, such as users 108 and the advertisers 102, can provide usage information to the system 104, such as, for example, whether a click-through related to an advertisement has occurred, whether a conversion has occurred, or whether some other defined event has occurred. Such usage information can be processed to measure performance metrics, such as click-through rates, conversion rates, etc.

A click-through can occur, for example, when a user of a user device, selects or "clicks" on an advertisement. The click-through rate can be a performance metric that is obtained by dividing the number of users that clicked on the advertisement or a link associated with the advertisement by the number of times the advertisement was delivered. For example, if an advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. Alternatively, a conversion may be defined as a user being shown an advertisement, and making a purchase on the advertiser's web page within a predetermined time (e.g., seven days). In yet another alternative, a conversion may be defined by an advertiser to be any measurable/observable user action such as, for example, downloading a white paper, navigating to at least a given depth of a website, viewing at least a certain number of web pages, spending at least a predetermined amount of time on a website or web page, registering on a website, dialing a telephone number, sending a product or service inquiry, etc. Other definitions of what constitutes a conversion are possible.

A conversion rate can be defined as the ratio of the number of conversions to the number of impressions of the advertisement (i.e., the number of times an advertisement is rendered) or the ratio of the number of conversions to the number of selections (or the number of some other earlier event). The type of conversion rate can be apparent from the context in which it is used. If a conversion is defined to be able to occur within a predetermined time since the serving of an advertisement, one possible definition of the conversion rate might only consider advertisements that have been served more than the predetermined time in the past.

Other usage information and/or performance metrics can also be used. The usage information and/or performance metrics can, for example, be revenue related or non-revenue related. In another implementation, the performance metrics can be parsed according to time, e.g., the performance of a particular content item may be determined to be very high on weekends, moderate on weekday evenings, but very low on weekday mornings and afternoons.

This usage information can include measured or observed user behavior related to advertisements that have been served. The system 104 performs financial transactions, such as crediting the publishers 106 and charging the advertisers 102 based on the usage information.

One example of a publisher 106 is a content server (e.g., domain name registrar) that places content (e.g., articles, discussion threads, music, video, graphics, search results, web page listings, information feeds, etc.) on one or more domains. The domain registrar server may submit a request for advertisements to an advertisement server in the system 104. The advertisement request may include a number of advertisements desired. The advertisement request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server, or a client rendering application (e.g., a browser) can combine the requested content with one or more of the advertisements provided by the system 104. This combined content and advertisements can be sent to (or rendered by) the user 108 that requested the content for presentation in a viewer (e.g., a browser or other content display system). The content server can transmit information about the advertisements back to the advertisement server, including information describing how, when, and/or where the advertisements are to be rendered (e.g., in HTML or JavaScript™).

As can be appreciated from the foregoing, the advertising management system 104 can serve publishers 106 such as content servers. The system 104 permits serving of advertisements targeted to content (e.g., documents) served by content servers. For example, a network or inter-network may include an advertisement server serving targeted advertisements in response to requests from a content server with advertisement spots. Suppose that the inter-network is the World Wide Web. One or more content servers may include one or more documents.

Documents may include web pages, email, content, embedded information (e.g., embedded media), meta-information and machine executable instructions, and advertisement spots. The advertisements inserted into advertisement spots in a document can vary each time the document is served or, alternatively, can have a static association with a given document.

In one implementation, the advertisement management system 104 may include an auction process to select advertisements. Advertisers may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $1.00, and the maximum amount advertiser C will pay is $0.75.

The rank of an advertisement that is displayed can be determined, for example, by multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

A: Rank=quality score×maximum cost-per-click=3.0× $0.50=1.50

B: Rank=quality score×maximum cost-per-click=1.0× $0.75=0.75

C: Rank=quality score×maximum cost-per-click=1.0× $1.00=1.00

The advertisers can be ranked as follows:

1. A
2. C
3. B

An advertisement can also be associated with an actual cost-per-click. The actual cost-per-click of the advertisement can be determined by the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20. The actual cost-per-click of advertisers A, B, and C can be determined as follows:

A: C's rank/A's quality score=0.1/3=$0.33+$0.01=$0.34

C: B's rank/C's quality score=0.75/1=$0.75+$0.01=$0.76

B: minimum cost-per-click=$0.20

In this example, A would only have to pay $0.34 to hold the first position in the list of advertisements. C would have to pay $0.76 to hold the second position. Advertiser B would be required to pay the minimum cost-per-click amount of $0.20.

Keywords that are associated with advertisements can also have a separate quality score. The keyword quality score can be the basis for measuring the quality and relevance of an advertisement and determining a minimum cost-per-click. The quality score can, for example, be determined by the advertisement's click-through rate, the relevance of the advertisement text, overall historical keyword performance, and the user experience on a landing page associated with the advertisement. A minimum cost-per-click can be determined for each advertisement, and can be based on quality of the advertisement.

The minimum cost-per-click is the minimum amount the advertiser must pay for each advertisement, e.g., the minimum amount the advertiser must pay for use of a keyword. In some implementations, the system 104 can utilize a quality-based bidding auction that can determine a minimum cost per click bid requirement. For the minimum bid, a keyword's quality score can, for example, be based on the click-through rate and relevance of the keyword, the advertisement text, and the advertisement landing page. For keywords having a low quality score, which is indicative of a poorly performing keyword and/or likewise indicative of a poor user experience, the minimum cost per click is increased. Accordingly, the poorly performing keywords can become inactive for an advertiser's account if the advertiser is not willing to pay the minimum cost per click. Conversely, a high quality keyword has a lower minimum cost per click, and thus the higher quality keyword is used more often, enriching the user experience.

The ranking of the advertisements described above can be modified according to one or more identified contexts. A context can, for example, define a specific context of a query, web page, document, or content item. As an example, the query "jaguar" can have the following contexts: jaguar car, jaguar animal, or jaguar game system. As such, a particular web page would generally be associated with one of the above general contexts. Accordingly, a context cluster can be defined by one or more content items, e.g., web pages, grouped under a similar context or topic. For example, web pages related to "jaguar" in a sports context may define a cluster; web pages related to "jaguar" in a wildlife context may define a cluster; advertisements related to "jaguar" in a sports context may define a cluster; advertisements related to "jaguar" in a wildlife context may define a cluster, etc.

A context score can, for example, be a value resulting from the combining of an advertisement cluster score and a corresponding content cluster score. For example, the context score may be calculated by combining an advertisement score and the content score of a particular search query or web page. In one implementation, the advertisement score can be calculated to be substantially inversely proportional to a rank of the advertisements. In general, context scores can be calculated by extracting, ranking, clustering, and/or scoring one or more similarities between topics within the content items or clusters. The context scores can be used to adjust advertisement rankings and/or advertisement presentations.

In some implementations, the advertisement system 104 can augment the advertisement rankings based on context scores by utilizing data related to user-specific topics. For example, the advertisement system 104 can provide advertisements corresponding to information accessed from a user-accessed search query, web page, web log, profile, or other user-associated feature or context. In some implementations, providing a variety of user-specific advertisement topics can maximize the probability that the user will find some of the advertisements relevant. As an example, the advertisement system 104 can use context or content scores (e.g., in a user's search query or web page content) to maximize targeted advertisement diversity as well as display advertisements with topics that appropriately match a user's current context. For example, if a user search session indicates a sports context for the query "Jaguar," then the advertisement system 104 may serve four advertisements in a sports context, two advertisements in a wildlife context, two advertisements in a pop-culture context, etc.

In some implementations, the users 108 can include a desktop computer user 108a. In other implementations, the users 108 can include a laptop user 108b. The desktop and laptop users 108a, 108b, respectively, can access the network 110 using any of a variety of different access methods. For example, the desktop and laptop users 108a, 108b can access the internet using a modem (e.g., cable modem, digital subscriber line (DSL) modem, dial-up modem, integrated service digital network (ISDN) modem, etc.) and any of myriad internet service providers (ISPs). In some implementations, advertisers can create text ads to be served in proximity to search results. In some implementations, creatives (e.g., web-based text ads) can include a headline, two lines of descriptive, and a display universal resource locator (URL).

In further implementations, the users 108 can include a mobile communications device 108c. Similar to the desktop and laptop users 108a, 108b, the mobile communications device 108c can be equipped to receive mobile text advertisements responsive to a search query. However, there are multiple versions of mobile communications devices 108c, not all of which are able to receive mobile text ads. Moreover, even among those mobile communications devices 108c that can receive mobile text ads, there are some mobile devices that can receive full web-based text ads, while there are other mobile device that can only receive specially formatted text advertisements.

In various examples, each of desktop, laptop and mobile users 108a, 108b, 108c can access the internet using any of a variety of wired or wireless communications protocols (e.g., wifi, radio, WCDMA, evolution data optimized (EV-DO), Bluetooth, etc.). In various examples, mobile devices 108c can include a constrained screen display, a mobile communications protocol, or combinations thereof, that prevent particular mobile devices 108c from properly displaying certain web pages, advertisements, web items, or combinations thereof.

In some implementations, the advertisement system 104 can identify the type of mobile communications device 108c associated with an advertising request (e.g., submitting a search query). For example, the page request received from a mobile communications device 108c can include information identifying the type of browser initiating the request. The type of browser initiating the request can thereby identify the types of advertisements that can be displayed by the requesting device 108c. In some implementations, a text advertisement can then be served based upon the type of device submitting the search query. For example, if the device 108c is a first-type device (e.g., a low-end device), the advertising system might serve only advertisements specifically created for mobile phones. In other examples, if the device 108c is a second level device (e.g., a mid-level device), a web-based text advertisement can be converted and sent to the mobile communications device 108c. In another example, if the device 108c is a third type of device (e.g., a high-end device), a web-based text advertisement can be served directly to the mobile communications device 108c.

In various implementations, an existing web-based text advertisement can be converted to a mobile advertisement based upon, for example, the size of the web-based text advertisement. For example, some mid-level devices are generally constrained by the screen size. Advertisements larger than a certain number of characters and/or lines might not display correctly on a mobile communications device 108c. In various implementations, web-based advertisements longer than 70 characters can have associated descriptive lines truncated by the advertisement system. In some of these implementations, the web-based text advertisement headline and display URL are sent to the mobile communications device 108c for display to the user. In other implementations, a portion of the creative can be truncated to fit within an allotted size for mobile text ads.

In still further implementations, a web-based text ad can be converted to another format and served to the mobile communications device 108c for display to a user. For example, a web-based text ad can be converted to an image that is scaled based upon the size of a display associated with the mobile communications device 108c. In other examples, a web based audio ad can be converted to a text ad based upon the capabilities of the mobile communications device 108c. In still further examples, a flash based ad can be converted to an animated graphical interchange format (GIF) file for display on the mobile communications device 108c. In some implementations, video advertisements can be re-encoded to a streaming format supported by the mobile communications device 108c (e.g., 3GP, MP4, etc.). Other inter-format conversions are possible.

In some implementations, a graphics based ad can be converted to properly display the graphics based ad to a mobile device 108c. For example, an advertisement with a large picture can be scaled to provide a graphics based ad that is proportional to the display associated with the mobile device 108c. In various implementations, a graphics based ad can be scaled if the text associated with the graphics based ad is readable. For example, the text associated with a graphics based ad can be automatically recognized using optical character recognition technology and the graphics based ad can be reduced until the font size associated with the text reaches a minimum font size.

In some examples, there can be multiple ads available for an advertiser 102. In such examples, an advertiser 102 might have created both a mobile text ad and a web-based text ad in an attempt to reach a wider audience. In some implementations, the advertising system 104 can be programmed to avoid serving advertisements from the same advertiser 102 to the mobile user 108c. In such implementations, the advertising system 104 can identify that there is a mobile ad associated with the advertiser 102 and serve the mobile ad rather than serving a converted web-based text ad. For example, if an advertiser 102 has created a web-based text ad and a mobile text ad, both might be suitable for serving to a mobile user as a result of a search query. In such instances, in the above implementations the mobile text ad can be served to all types of mobile communications devices 108c to the exclusion of serving the web-based text ad or a conversion of the web-based text ad for mid-level mobile communications devices 108c.

In some implementations, the landing page (e.g., identified by a target URL) of a web-based text ad can be examined to determine whether the page can be transcoded for mobile communications devices. In some examples, mid-level mobile communications devices 108c may not be able to display a landing page. In some implementations, the examination of the landing pages associated with a store of web-based text ads can be performed by an offline process. The process, for example, can automatically examine the landing pages associated with the web-based text ads to identify characteristics of the landing page that do not transcode properly. For example, in some implementations, pages that include a significant amount of Javascript or Flash are not subject to transcoding. In some implementations, pages with shopping carts that use secure hypertext transfer protocol (HTTPS) are not subject to transcoding based upon policy. In further implementations, multiple page levels can be followed to determine whether those second, third, fourth, etc. level pages can be transcoded.

In some implementations, the process to determine whether a page can be transcoded can execute periodically on landing pages associated with a store of web-based text ads. In further implementations, the landing pages associated with web-based text ads that have counterpart mobile text ads can be excluded from the process. For example, if an advertiser has created a mobile text ad, such an implementation assumes that the landing page associated with the mobile text ad is formatted properly for providing to mobile communications devices 108c.

In various implementations, the advertising system 104 can avoid serving a converted web-based text ad that is associated with a landing page that cannot be transcoded for viewing by the mobile communications device 108c. For example, if a mobile communications device 108c cannot display a web-based text ad properly, it is unlikely that the device 108c will be able to display a landing page associated with the web-based text ad. Thus, in some implementations, the advertising system 104 does not convert web-based text ads associated with web pages that cannot be transcoded.

Figure 2A:
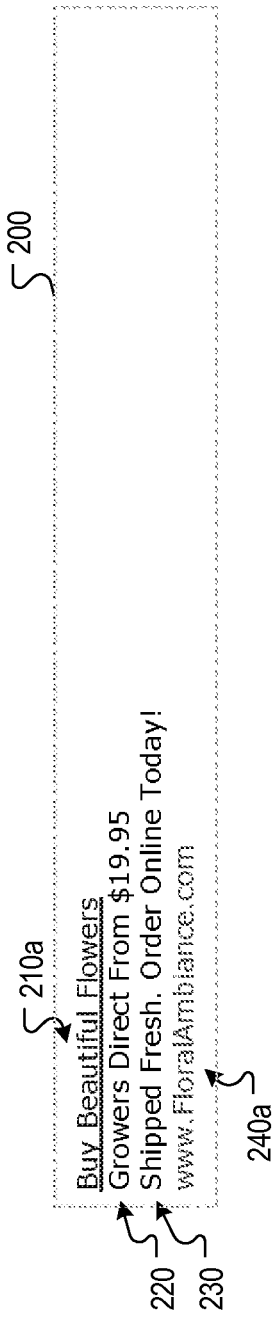
FIG. 2A is a screenshot of an example web-based text ad.

FIG. 2A is a screenshot of an example web-based text ad. The web-based text ad creative 200 can include a headline 210a, a first descriptive 220, a second descriptive 230 and a display URL 240a. In some implementations, desktop text ads can include a headline 210a limited to 25 characters, two description lines 220, 230 limited to 35 characters each, and a display URL 240a limited to 35 characters. In various implementations, the headline 210a can be chosen by the advertiser (e.g., advertiser 102 of FIG. 1) or can be generated (e.g., automatically or manually) by an advertising system (e.g., advertising system 104 of FIG. 1). Additionally, in various implementations, the first and second descriptive lines 220, 230 can be provided by an advertiser or can be generated an the advertising system. The display URL 240a can be a domain level URL provided by an advertiser (e.g., advertiser 102 of FIG. 1) or can be generated by an advertising system (e.g., advertising system 104 of FIG. 1). In other implementations, the display URL 240b can be a more detailed URL that fits within the character limit for web-based text ads.

Figure 2B:
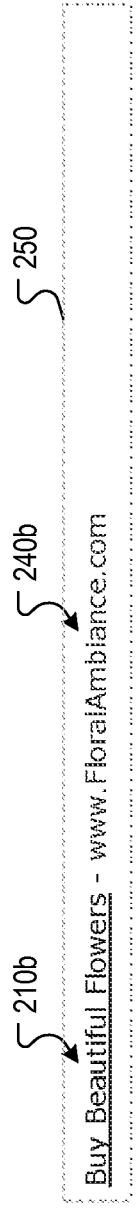
FIG. 2B is a screenshot of an example of a converted version web-based text ad.

FIG. 2B is a screenshot of an example of a converted version web-based text ad. In some implementations, the converted web-based text ad creative 250 can include a headline 210b and a display URL 240b. In additional implementations, the creative can be limited to a total length of 70 characters. Web-based text ads that are greater than 70 characters can be converted to have fewer than 70 characters. For example, the descriptive text (e.g., descriptive lines 220, 230 of FIG. 2A) of a web-based text ad can be removed.

In other implementations, other character maximums can be chosen. For example, the maximum characters can be set at 56, and in some implementations, this maximum number of characters can be divided between each of the fields, thereby assigning each field a maximum character length. For example, the headline field might be assigned a maximum character length of 18, a first descriptive line might be assigned a maximum length of 18, a second descriptive line can be removed, and the display URL might be assigned a maximum length of 20 for a total of 56 characters. In some implementations, each of the fields can be truncated at the maximum character allotment for the respective field. In other implementations, an advertising system can automatically select words from the web-based text advertisement for removal from the field. For example, in some implementations, an advertising system can remove adverbs and adjectives from the field. In other implementations, any definite and indefinite articles can be removed from the field. In some implementations, the headline and/or description can be replaced by a generic headline based upon the search query entered by the user. In various implementations, the length of a mobile creative can be limited based upon the country in which the mobile device resides. For example, the expression of a text ad in some languages might require more or less room on a mobile phone. In further implementations, the length of a mobile creative can be limited by regulation or industry standard.

Figure 3:
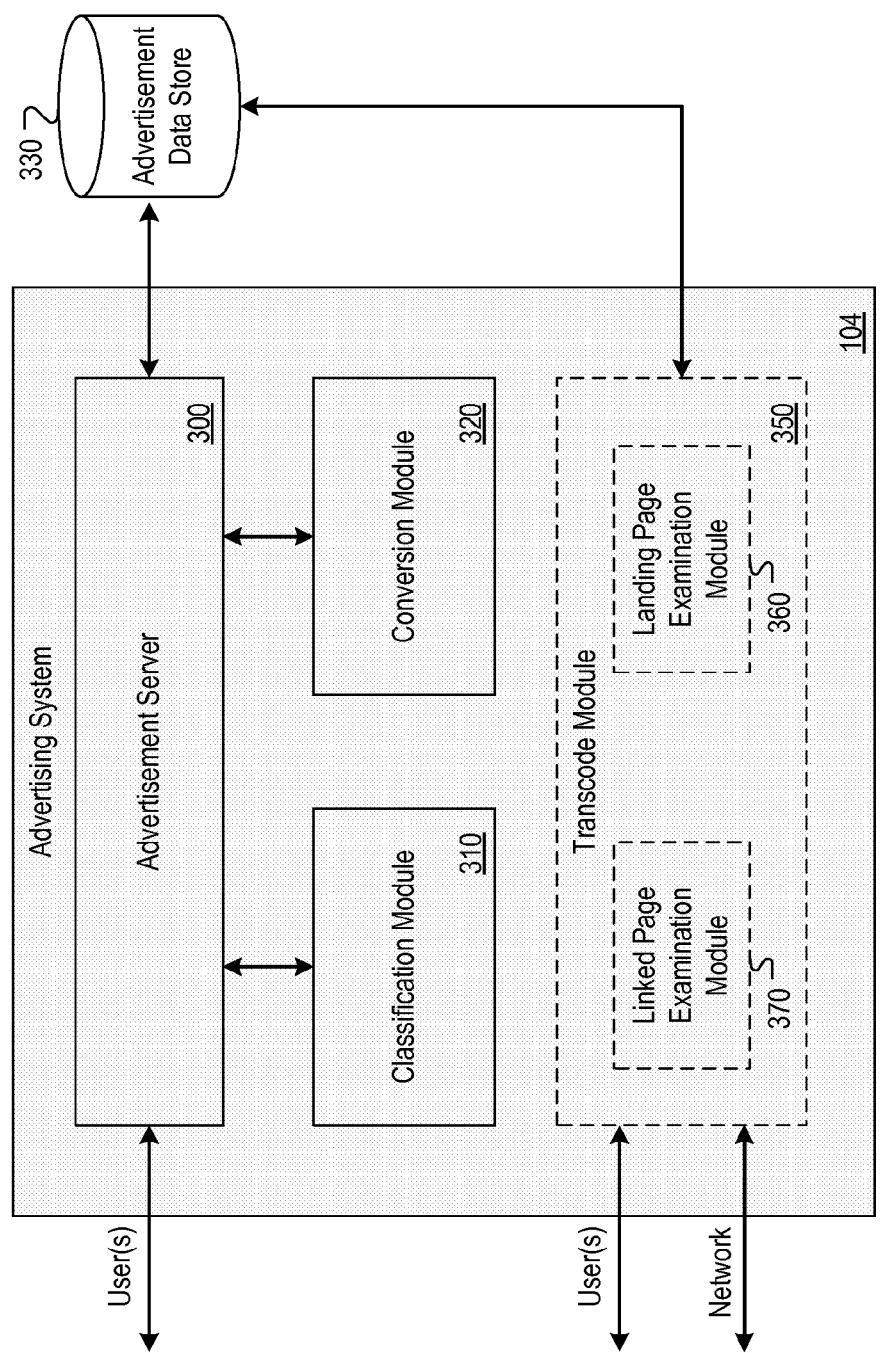
FIG. 3 is a block diagram depicting an example advertising system.

FIG. 3 is a block diagram depicting an example advertising system 104. In some implementations, the advertising system 104 can include an advertising server 300, a classification module 310, a conversion module 320. The advertising system 104 can also be coupled to an advertisement data store 330. The advertising server 300 can be configured to receive queries (e.g., search queries and/or ad queries). In response to the queries, the advertising server can identify relevant advertising to serve in response to the query based upon advertisements stored in the advertisement data store. 330.

In some implementations, the advertising server can identify a type of mobile device associated with the query. Based upon the type associated with the query, the advertising server can select from among candidate advertisements including web-based text ads and mobile text ads. In those examples where a low-end mobile device is identified, some implementations limit the candidate advertisements to mobile specific text ads (e.g., those advertisements created specifically for distribution to mobile devices). In those examples where a high-level mobile device is identified, some implementations do not limit the candidate advertisements. In those examples where a mid-level mobile device is identified, some implementations limit the candidate advertisements to convertible web-based text ads and mobile specific ads.

In some implementations, convertible web-based text ads can be identified based upon the operation of an optional transcode module 350. The transcode module 350 can use a landing page examination module 360 to examine the landing pages associated with the store of web-based text ads stored in the advertisement data store 330. In some implementations, the store of web-based text ads can be limited to those web-based text ads that do not are not related to a mobile specific text ad. The landing page examination module 360 can examine the landing pages associated with the web-based text ads for the inclusion of elements that are difficult to transcode. For example, Flash programming elements and/or Javascript programming elements can be difficult to transcode for display on those mobile devices that cannot display full web-based text ads. In other implementations, the landing page examination module 360 can examine landing pages associated with the web-based text ads for the inclusion of elements that are not transcoded based on policy or legal liability. For example, a landing page containing secure hypertext transfer protocol (e.g., such as might be found in a "shopping cart" web page) might not be transcodable based on policy.

In further implementations, the transcode module 350 might include a linked page examination module 370. In various implementations, the linked page examination module 370 can identify linked pages based upon the links included on a landing page. The linked page examination module 370 can examine the linked pages to determine whether the linked pages can be transcoded. In additional implementations, the transcode module 350 can rate the site associated with the landing page based upon the extent to which the pages associated with the site can be transcoded for display on a mobile device.

Where the advertising server has identified candidate advertisements that include convertible web-based text ads, the conversion module 320 can convert the web-based text ads to a format suitable for display on a mid-level mobile device. For example, as shown in FIGS. 2A and 2B, the conversion module 320 can determine whether the web-based text ad is greater than a maximum number of characters (e.g., 70 characters), and remove one or more of the descriptive lines to enable the converted web-based text ad to be served to the mid-level mobile device. Other conversions, including those described herein, are possible.

In some implementations, the advertisement server can respond to the query by serving the converted web-based text ad to the mobile device that originated the query. In those implementations where the query is a search query, the advertisement server can receive search results associated with the query from a search engine and can format the candidate advertisements (e.g., including the converted web-based text ad) for display proximate to (e.g., above, alongside, below, etc.) the search results. In other implementations, the advertisement system can format the candidate advertisements (e.g., including the converted web-based text ads) for display alongside search results, and can provide the formatted candidate advertisements to a search engine for serving to the mobile device that originated the query.

Figure 4A:
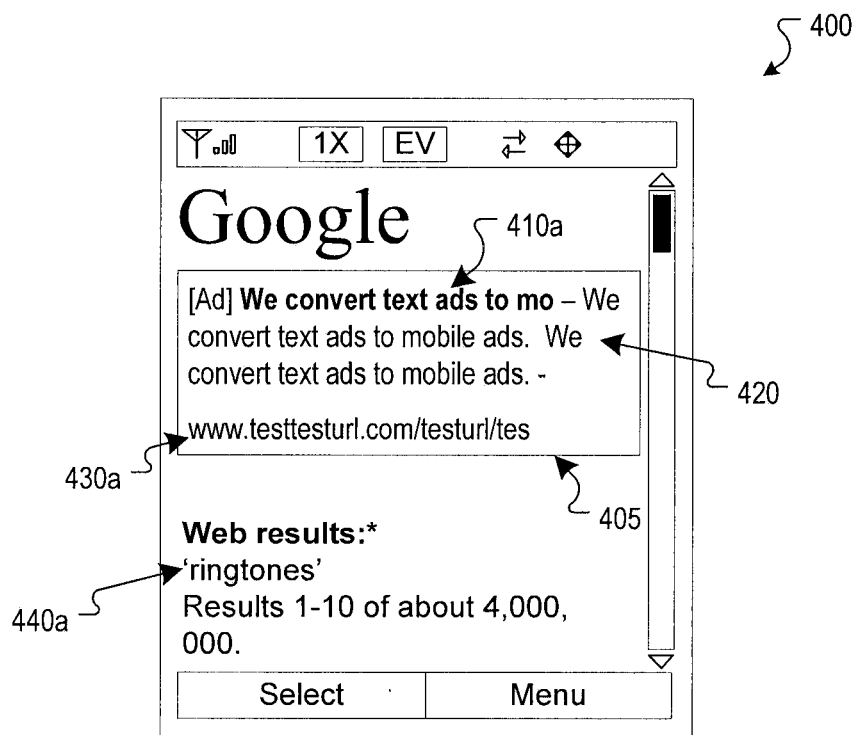
FIG. 4A is a screen shot illustrating an example web-based text ad displayed on a mobile device.

FIG. 4A is a screen shot 400 illustrating an example web-based text ad 405 displayed on a mobile device. In various implementations, the mobile device of FIG. 3 is a high-end mobile device operable to display web-based text ads 405 without conversion to a mobile device format. The web-based text ad 405 can include a headline 410a, descriptive lines 420, and a display URL 430a. In various implementations, the headline 410a, descriptive 420 and display URL 430a can be provided by an advertiser or generated by the advertising system. The web-based text ad can be served in response to a query 440a.

Figure 4B:
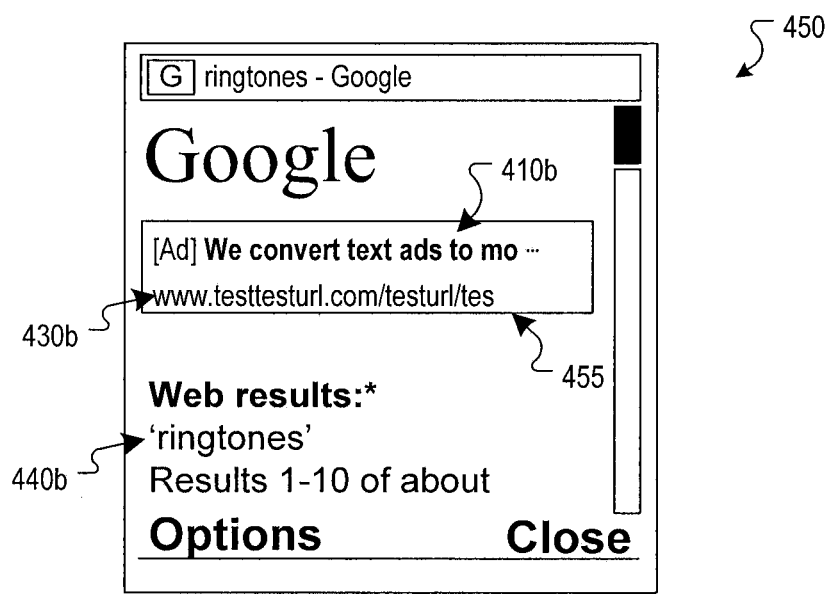
FIG. 4B is a screen shot illustrating an example converted web-based text ad displayed on a mobile device.

FIG. 4B is a screen shot 450 illustrating an example converted web-based text ad 455 displayed on a mobile device. In various implementations, the mobile device of FIG. 3B is a mid-level mobile device operable to display converted web-based text ads 455. The web-based text ad 455 can include a headline 410b and a display URL 430b. In various implementations, the headline 410a and display URL 430a can be provided by an advertiser or generated by the advertising system. The web-based text ad can be served in response to a query 440b.

Figure 5:
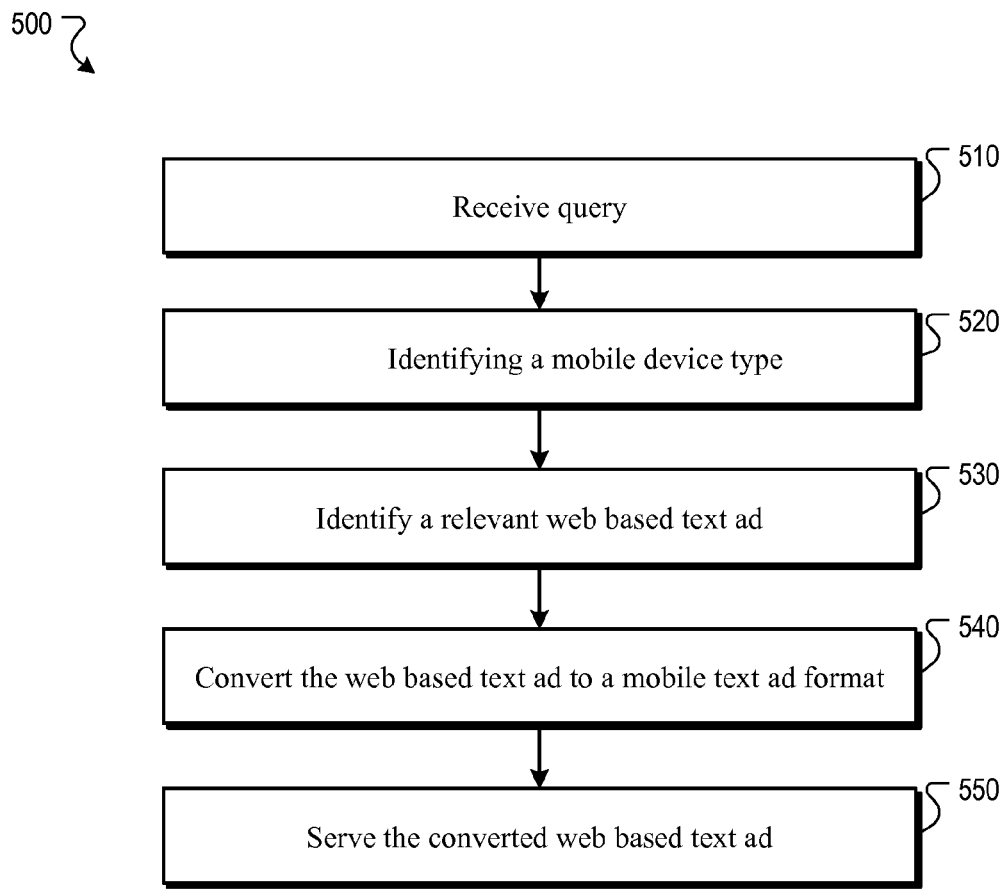
FIG. 5 is a flowchart illustrating an example method for adaptation of web-based text ads.

FIG. 5 is a flowchart illustrating an example method 500 for adaptation of web-based text ads. At stage 510, a query is received. The query can be received, for example, by a advertising server (e.g., advertising server 300 of FIG. 3). In some implementations, the query can be an ad query requesting an ad for serving with a web page. In other implementations, the query can be a search query requesting information about a subject based upon the imposition of one or more search terms.

At stage 520, a mobile device type associated with the query is identified. The mobile device type can be identified for example, by a classification module (e.g., classification module 310 of FIG. 3). The mobile device type can be identified for example based upon the query. For example, when a mobile device originates a query, the query includes information including the browser associated with the mobile device. Based upon the browser type, the classification module can identify the types of display associated with the mobile device and the types of web pages and/or content that can be displayed by the mobile device.

At stage 530, relevant web-based text ads can be identified. Relevant web-based text ads can be identified, for example, by an advertising server (e.g., advertising server 300 of FIG. 3). In various implementations, relevant advertisements can be identified based upon terms imposed by the query and how well those terms match the ad words. In some implementations, relevant mobile specific text ads can be identified in parallel with the relevant web-based text ads. In further implementations, web-based text ads with counterpart mobile specific text ads that satisfy the query can be removed from a candidate pool of advertisements to be served to the mobile device.

At stage 540, web-based text ads can be converted to a mobile text ad format. The web-based text ads can be converted, for example, by a conversion module (e.g., conversion module 320 of FIG. 3). In some implementations, eligible web-based text ads can be converted offline, and retrieved when it is determined that the web-based text ad satisfies a query. In other implementations, eligible web-based text ads can be converted at the time the query is served. In some implementations, the web-based text ad can be converted by determining if the web-based text ad exceeds a maximum length. If the web-based text ad exceeds a maximum length, in some implementations, the ad can be converted by removing the descriptive lines associated with the web-based text ad. In other implementations, the web-based text ad can be converted by truncating the portion of the descriptive that will reduce the length of the web-based text ad to the maximum length. Other conversions are possible.

At stage 550, the converted web-based text ad is served. The converted web-based text ad can be served, for example, by an advertising server (e.g., advertising server 300 of FIG. 3). In some implementations, the converted web-based text ad can be served to a search engine for serving proximate to search results associated with a search query. In other implementations, the converted web-based text ad can be formatted and served to a publisher for inclusion in a web page. Other serving methodologies are possible.

Figure 6:
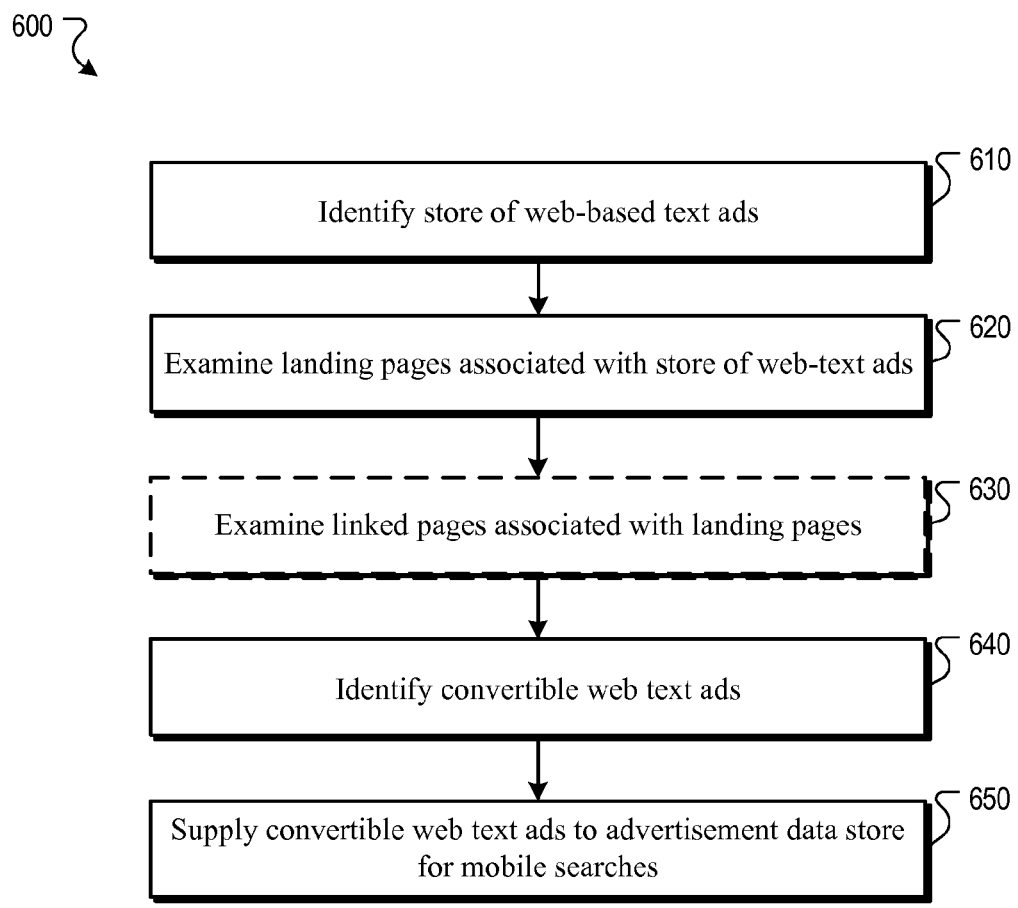
FIG. 6 is a flowchart illustrating an example method for identifying convertible web-based text ads.

FIG. 6 is a flowchart illustrating an example method 600 for identifying convertible web-based text ads. At stage 610, a store of web-based text ads is identified. In some implementations, the store of web-based text ads can be identified, for example, by a transcode module (e.g., transcode module 350 of FIG. 3), in conjunction with an advertisement data store (e.g., advertisement data store 330 of FIG. 3). In various implementations, the store of web-based text ads can be identified based upon the universe of web-based text ads stored in the advertisement data store. In other implementations, the store of web-based text ads can be identified based upon which web-based text ads are not associated with any mobile specific text ads.

At stage 620, landing pages associated with store of web-text ads are examined. The landing pages can be examined, for example, by a landing page examination module (e.g., landing page examination module 360 of FIG. 3). In some implementations, the landing page examination module can identify those landing pages which would be difficult to transcode for display on a mid-level mobile device. In various implementations, the landing pages that are difficult to transcode disable the advertising server from serving a conversion of the associated web-based text ad. In various implementations, web pages that are difficult to transcode can be identified based upon their inclusion of Javascript programming, Flash programming, or HTTPS encoding.

At optional stage 630, linked pages associated with landing pages can be examined. The linked pages can be examined, for example, by a linked page examination module (e.g., linked page examination module 370 of FIG. 3). In some implementations, the linked page examination module can identify the links included in a landing page, and retrieve the web pages associated with those links. The link page examination module can then examine those pages to determine whether any of the linked pages contain content that is difficult to transcode for display on a mid-level mobile device.

At stage 640, convertible web-based text ads can be identified. The convertible web-based text ads can be identified, for example, by a transcode module (e.g., transcode module 350 of FIG. 3). In various implementations, the convertible web-based text ads include those creatives associated with landing pages that can be transcoded for display on a mobile device.

At stage 650, convertible web-based text ads can be stored to advertisement data store for mobile searches. The convertible web-based text ads can be stored, for example, by a transcode module (e.g., transcode module 350 of FIG. 3) in conjunction with an advertisement data store (e.g., advertisement data store 330 of FIG. 3). In various implementations, those advertisements which are convertible can be marked (e.g., flagged) to indicate that the associated ads are eligible for serving to mid-level mobile devices. In some implementations, the transcoded web pages can be stored to a data store and associated with the convertible web-based text ads.

Figure 7:
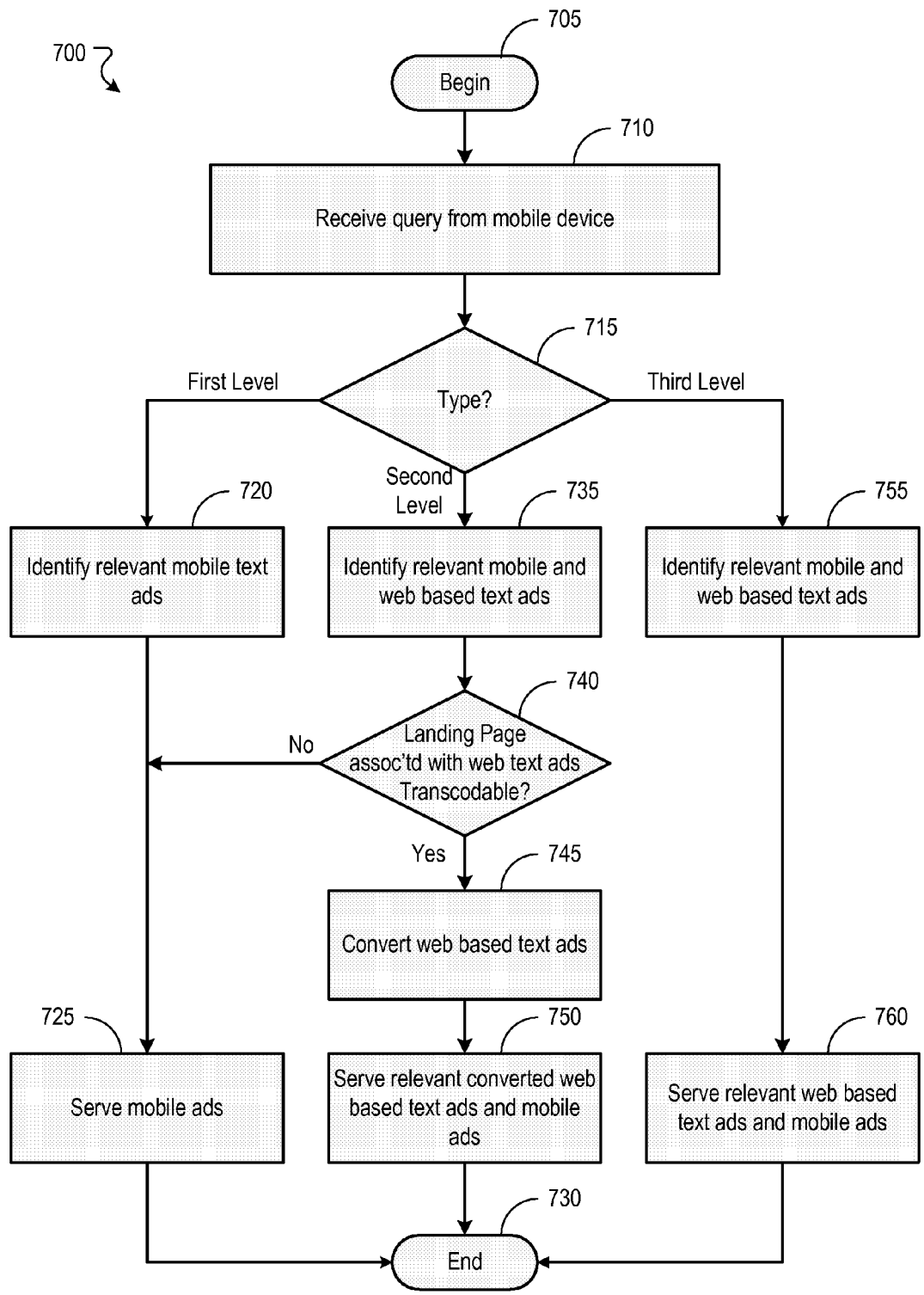
FIG. 7 is a flowchart illustrating an example method for serving a query received from a mobile device.

FIG. 7 is a flowchart illustrating an example method 700 for serving a query received from a mobile device. The method 700 begins as stage 705. At stage 710, a query is received from mobile device. The query can be received, for example, by a advertising server (e.g., advertising server 300 of FIG. 3). In some implementations, the query is received through a publisher or a search engine. In other implementations, the query can be received directly from the mobile device through a network. At stage 715, a type associated with the query is identified. The type can be identified for example, by a classification module (e.g., classification module 310 of FIG. 3). In some implementations, the type can be identified based upon the headers associated with the query. The type can identified the display ability associated with a mobile device or browser located on the mobile device.

If the type is identified as at a first predetermined level (e.g., low-end), at stage 720 relevant mobile specific text ads are identified. Relevant mobile text ads can be identified, for example, by an advertising server (e.g., advertising server 300 of FIG. 3) in conjunction with an advertising data store (e.g., advertising data store 330 of FIG. 3). The mobile specific text ads can be identified, for example, based on their relevancy to the query. At stage 725, the mobile specific text ads are served to the mobile device. The mobile specific text ads can be served, for example, by an advertising server (e.g., advertising server 300 of FIG. 3). At stage 730, the method ends.

Returning to stage 715, if the type is identified as at a second level (e.g., at mid-level), at stage 735, relevant mobile and web-based text ads can be identified. The relevant mobile and web-based text ads can be identified, for example, by an advertising server (e.g., advertising server 300 of FIG. 3) in conjunction with an advertising data store (e.g., advertising data store 330 of FIG. 3). The ads can be identified, for example, based upon their relevancy to the query. At stage 740, a determination is made whether the landing page(s) associated with the relevant web-based text ad(s) is (are) transcodable. The determination can be made, for example, by a transcode engine (e.g., transcode engine 350 of FIG. 3).

If the landing page(s) associated with the relevant web-based text ad(s) is (are) not transcodable, the relevant mobile specific text ads are served at stage 725. If the landing page(s) associated with the relevant web-based text ads are transcodable, the web-based text ads are converted at stage 745. The web-based text ads can be converted, for example, by a conversion module (e.g., conversion module 320 of FIG. 3). At stage 750, the relevant ads (e.g., converted web-based text ads and/or mobile specific text ads) are served to the mobile device. The relevant ads can be served, for example, by an advertising server (e.g., advertising server 300 of FIG. 3). In various examples, some of the landing pages associated with a relevant web-based text ad might be transcodable, while others might not be transcodable. In such examples, those web-based text ads associated with transcodable landing pages can be converted for serving to the mobile device, while those web-based text ads that are associated with non-transcodable landing pages are not served to the mobile device. The method 700 ends at stage 730.

Returning to stage 715, if the type is determined to be of a third level (e.g., high-end), relevant mobile and web-based text ads are identified at stage 755. The relevant mobile and web-based text ads are identified, for example, by an advertising server (e.g., advertising server 300 of FIG. 3) in conjunction with an advertising data store (e.g., advertising data store 330 of FIG. 3). At stage 760, relevant web-based text ads and mobile ads are served to the mobile device. The relevant web-based text ads and mobile ads can be served, for example, by an advertising server (e.g., advertising server 300 of FIG. 3). The method 700 ends at stage 730.

Figure 8:
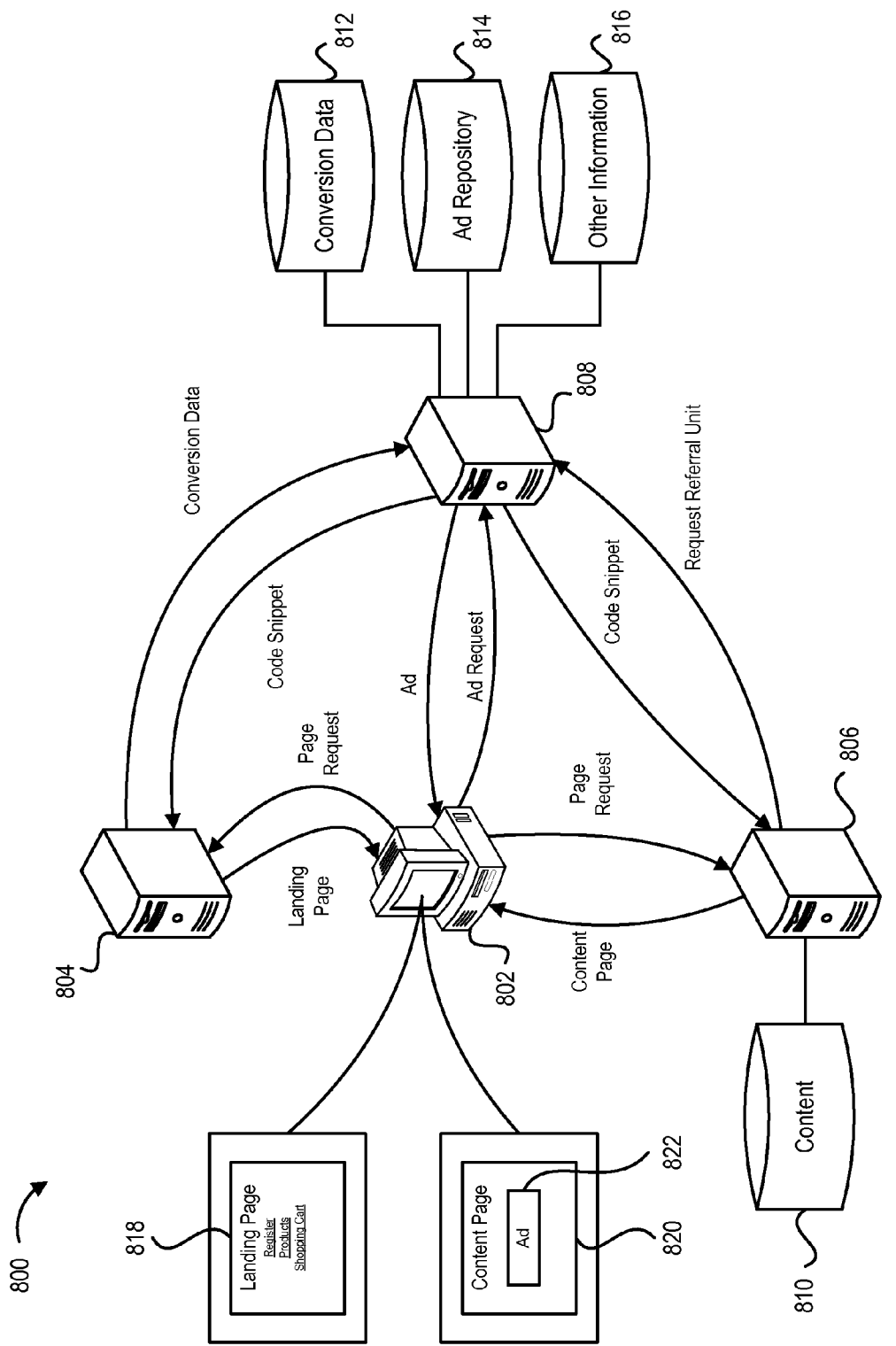
FIG. 8 is a block diagram showing an implementation of an online advertising system

FIG. 8 is a block diagram showing an implementation of an online advertising system 800. In some implementations, one or more advertisers 804 can directly, or indirectly, enter, maintain, and track advertisement ("ad") information in an ad management system 808. The ads can be stored in a repository 814 coupled to the system 808 (e.g., a MySQL® database). The ads may be in the form of graphical ads, such as banner ads, text only ads, image ads, audio ads, video ads, ads combining one of more of any of such components, etc. The ads may also include embedded information, such as embedded media, links, meta-information, and/or machine executable instructions. One or more publishers 806 may submit requests for ads to the system 808. The system 808 responds by sending ads to the requesting publisher 806 for placement on one or more of the publisher's web properties (e.g., websites and other network-distributed content). The ads can be placed with or embedded in the publisher's content (e.g., videos, articles, search results), which can be stored in a repository 810 at the publisher 806, and/or placed with content received from other sources (e.g., other publishers, advertisers).

Other entities, such as users 802 and advertisers 804, can provide usage information to the system 808, such as, for example, whether or not a conversion or click-through related to an ad has occurred. This usage information can include measured or observed user behavior related to ads that have been served. In some implementations, the system 808 performs financial transactions, such as crediting the publishers 806 and charging the advertisers 804 based on the usage information.

A computer network, such as a local area network (LAN), wide area network (WAN), the Internet, wireless network or a combination thereof, can connect the advertisers 804, the system 808, the publishers 806, and the users 802.

One example of a publisher 806 is a general content server that receives requests for content (e.g., articles, discussion threads, music, video, graphics, search results, web page listings, information feeds, etc.), and retrieves the requested content in response to the request. The content server may submit a request for ads to an ad server in the system 808. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 808. This combined content and ads can be sent to the user 802 that requested the content for presentation in a viewer (e.g., a browser or other content display system). The content server can transmit information about the ads back to the ad server, including information describing how, when, and/or where the ads are to be rendered (e.g., in HTML or JavaScript™).

Another example publisher 806 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for ads to the system 808. The request may include a number of ads desired. This number may depend on the search results, the amount of screen or page space occupied by the search results, the size and shape of the ads, etc. In some implementations, the number of desired ads can be from one to ten, or from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the ads provided by the system 808. This combined information can then forwarded to the user 802 that requested the content. The search results can be maintained as distinct from the ads, so as not to confuse the user between paid advertisements and presumably neutral search results.

Finally, the search service can transmit information about the ad and when, where, and/or how the ad was to be rendered back to the system 104.

As can be appreciated from the foregoing, the advertising management system 808 can serve publishers 806, such as content servers and search services. The system 808 permits serving of ads targeted to documents served by content servers. For example, a network or inter-network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

In some implementations, a publisher 806 may login to the system 808 by providing a user name and password to the system 808. The login may occur, for example, through a web page and the login process may use encryption, such as secure Hypertext Transfer Protocol (HTTPS). The publisher 806 may select from a list specific products and/or services (referred to here as referral items) to advertise at a publisher site. The list of referral items may be the result of a search initiated by the publisher user based on, for example, a keyword or category selection made by the publisher user. In another example, the publisher 806 may select one or more keywords and/or one or more referral item categories that the system 808 may use to automatically determine referral items. Alternatively, the publisher 806 may provide site content to the system 808 or the system 808 may retrieve site content from the publisher 806. The system 808 then may contextually determine referral items based on, for example, relevance of referral items to the publisher site content.

In another example, the system 808 may determine referral items based on behaviors of the end user, such as a particular search query performed on a search engine website, or a geographical location of the end user, such as products/services for businesses located near the end user. In addition, a combination of the examples for determining referral items described above may be used.

In some implementations, the publisher 806 may select particular ads (referred to here as referral units) associated with a determined referral item to present on a publisher web site. Ads may include, for example, text links, images, audio, video, or other media and may be formatted, for example, in a banner/horizontal orientation or a sidebar/vertical orientation. In this example, the publisher 806 selects the referral units to present at the publisher web site. Alternatively, the system 808 may select appropriate referral units based on, for example, a predetermined referral unit type specified by the publisher user, such as banner ads. In addition, the system 808 may rotate the selected referral unit from a list of referral units. In FIG. 8, the publisher 806 selected and ad 822 for a content page 820.

In some implementations, the publisher 806 receives one or more code snippets, each associated with a selected referral unit. Each code snippet can include a signed or encoded specification of the referral ad(s) determined by the publisher 806. For example, the publisher 806 may receive a code snippet, from the system 808, associated with a selected referral unit, such as a banner ad for an MP3 (MPEG-1 Audio Layer 3) music player. In some implementations, the code snippet includes a specification corresponding to the selected ad(s) that associate with a set of conversion actions (e.g., purchasing the MP3 player, subscription to a mailing list) which may result from interaction with the ad by a user 802 (e.g., a clickthrough). In other implementations, when the ads that are eligible for a particular set of conversion actions are known by the system 808, the specification can be omitted from the code snippet. When a conversion occurs, the conversion action allows the system 808 to determine how much the publisher 806 is credited resulting from showing the ad at the publisher web site.

In some implementations, one or more code snippets can be added to web page code of the publisher 806. For example, the publisher 806 may add the banner ad code snippet to the publisher web page. In some implementations, the code snippet is a web script, such as JavaScript®. The execution of the code snippet by the user 802 results in a contact with the system 808 and the display of the ad to the user 802. When the user 802 clicks on the displayed ad, the system 808 is contacted again, and the user 802 is redirected to a landing page 818 of the advertiser's web site. During this event the user 802 can receive a signed browser cookie from the system 808. In some implementations, tampering with the contents of the signed cookie invalidates conversion actions associated with the cookie. The cookie can include information, such as an identifier of the MP3 player banner ad, an identifier of the publisher 806, and the date/time the banner ad was selected by the user 802. The cookie can then be used together with information associated with conversion actions performed at the advertiser 804 by the user 802 to credit the publisher 806 and debit the advertiser 804.

In some implementations, an advertiser 804 may login to the system 808 by providing a user name and password to the system 808. The login may occur, for example, through a web page and the login process may use encryption, such as secure Hypertext Transfer Protocol (HTTPS).

Once logged in, the advertiser 804 may select a conversion type from a list provided by the system 808, or make an input including a new conversion type. Each conversion type corresponds to a conversion action that the user 802 may perform, such as a purchase of a product or service, a selection of a banner ad (click-through) or other action.

In some implementations, the advertiser 804 may input description information to the system 804 to assist the publishers 806 in determining referral units to publish.

In some implementations, the advertiser 804 may input a cost/value associated with the selected conversion type, such as a 5 dollar credit to the publisher 806 for each product or service purchased.

In some implementations, the advertiser 804 may create a banner ad that the publisher 806 provides the user 802.

In some implementations, a code snippet includes one or more signed conversion type identifiers (IDs), for insertion in a confirmation page script. For example, the system 808 can generate a signed conversion type identifier associated with the selected conversion type, the specified cost per conversion, and the created referral unit. The system 808 transmits the signed conversion type identifier to the advertiser 804 within a code snippet.

In some implementations, the user 802 can select a particular banner ad at the publisher 806. The publisher code snippet directs the user 802 to the system 808 from which a signed browser cookie is retrieved. The user 802 is then directed to a web page at the advertiser 804. The user 802 performs a conversion action at the advertiser 804, such as purchasing a product or service, registering, joining a mailing list, etc. The advertiser code snippet can be included within a conversion confirmation page script, such as a script within a web page presented after the purchase. The user 802 executes the advertiser code snippet. The advertiser code snippet contacts the system 808 and reports the conversion type identifier from the advertiser code snippet as well as information from the cookie, such as a publisher identifier, a referral unit identifier, and a date/time of the referral unit impression and click. In some implementations, conversion data (e.g., number and types of conversions) can be stored in a repository 812, where it can be used by the system 808 to improve ad targeting performance.

In some implementations, the advertiser code snippet may be executed from a conversion confirmation web page indicating that the user 802 performed a conversion action.

In some implementations, the advertiser code snippet may retrieve a referral unit identifier, a publisher identifier, and a date/time of the referral unit impression and click from a cookie located at the user 802. The advertiser code snippet can include the conversion type identifier associated with the conversion action performed by the user 802.

In some implementations, the advertiser code snippet, executing at the user 802, transmits the identified conversion parameters to the system 808.

In some implementations, the advertiser code snippet may be executed from a conversion confirmation web page indicating that the user 802 performed a conversion action.

In some implementations, the advertiser code snippet may retrieve a referral unit identifier, a publisher identifier, and a date/time of the referral unit impression and click from a cookie located at the user 802. The advertiser code snippet includes the conversion type identifier associated with the conversion action performed by the user 802.

In some implementations, the advertiser code snippet, executing at the user 802, transmits the identified conversion parameters to the advertiser 804. The advertiser 804 accumulates the conversion parameters and periodically transmits them to the system 808.

In some implementations, other types of data can be collected by the system 808 and stored in a repository 816. Such data may include, for example, personal profiles of users, geographic locations of users, ad context information, etc. All or some of this information can be used to improve ad targeting performance.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

The invention claimed is:

1. A method comprising:
   receiving, by a server system, a request from a mobile device;
   identifying, by the server system and based on the request, a processing capability associated with the mobile device;
   selecting, by the server system, an ad that includes a reference to a landing page;
   examining, by the server system, content of the landing page;
   determining, by the server system and based on the processing capability and based on the examined content, that the mobile device is capable of displaying the landing page referenced by the selected ad; and
   in response to determining that the mobile device is capable of displaying the landing page referenced by the selected ad, serving, by the server system, the selected ad to the mobile device.

2. The method of claim 1, wherein the ad is a web-based text ad.

3. The method of claim 1, wherein the request is a search query.

4. The method of claim 1, further comprising in response to determining that the mobile device is capable of displaying the landing page referenced by the selected ad, converting the selected ad for presentation on the mobile device; and
   wherein serving the selected ad to the mobile device comprises serving the converted ad to the mobile device.

5. The method of claim 1, further comprising:
   determining, based on the processing capability, that the mobile device is capable of displaying a linked page that is referenced by the landing page,
   wherein serving the selected ad to the mobile device further comprises serving the selected ad to the mobile device in response to determining, based on the processing capability, that the mobile device is capable of displaying the linked page referenced by the landing page.

6. The method of claim 1, wherein selecting an ad comprises selecting an ad based on the request.

7. The method of claim 5, wherein determining, based on the processing capability, that the mobile device is capable of displaying a linked page that is referenced by the landing page further comprises retrieving the linked page referenced by the landing page.

8. The method of claim 1, wherein determining, based on the processing capability, that the mobile device is capable of displaying the landing page referenced by the selected ad comprises determining whether the landing page includes Flash content.

9. The method of claim 1, wherein determining, based on the processing capability, that the mobile device is capable of displaying the landing page referenced by the selected ad includes determining whether the landing page includes Javascript content.

10. The method of claim 1, wherein determining, based on the processing capability, that the mobile device is capable of displaying the landing page referenced by the selected ad includes determining whether the landing page includes content accessed through a secure hypertext transfer protocol.

11. The method of claim 4, wherein converting the selected ad for presentation on the mobile device comprises converting the selected ad from a first format to a second format.

12. The method of claim 11, wherein the first format is a text format and the second format is an image format.

13. The method of claim 11, wherein the first format is a text format and the second format is an audio format.

14. The method of claim 4, wherein converting the selected ad includes scaling an image containing text.

15. The method of claim 4, wherein converting the selected ad includes recognizing text associated with a graphics-based ad with optical character recognition.

16. The method of claim 4, wherein converting the selected ad comprises:
determining, based on the request, a maximum length to display on a mobile device;
determining that the selected ad is longer than the maximum length; and
removing descriptive text from the selected ad so that the selected ad is no longer than the maximum length.

17. A system comprising:
one or more computers; and
a computer-readable medium coupled to the one or more computers having instructions stored thereon which, when executed by the one or more computers, cause the one or more computers to perform operations comprising:
receiving a request from a mobile device;
identifying, based on the request, a processing capability associated with the mobile device;
selecting an ad that includes a reference to a landing page;
examining content of the landing page;
determining, based on the processing capability and based on the examined content, that the mobile device is capable of displaying the landing page referenced by the selected ad; and
in response to determining that the mobile device is capable of displaying the landing page referenced by the selected ad, serving the selected ad to the mobile device.

18. The system of claim 17, the operations further comprising:
determining, based on the processing capability, that the mobile device is capable of displaying a linked page referenced by the landing page,
wherein serving the selected ad to the mobile device is in response to determining, based on the processing capability, that the mobile device is capable of displaying the linked page referenced by the landing page.

19. The system of claim 17, wherein determining, based on the processing capability, that the mobile device is capable of displaying the landing page referenced by the selected ad comprises determining whether the landing page includes Flash content.

20. The system of claim 17, wherein determining, based on the processing capability, that the mobile device is capable of displaying the landing page referenced by the selected ad comprises determining whether the landing page includes Javascript content.

21. The system of claim 17, wherein determining, based on the processing capability, that the mobile device is capable of displaying the landing page referenced by the selected ad comprises determining whether the landing page includes content accessed through a secure hypertext transfer protocol.

22. The system of claim 17, wherein determining, based on the processing capability, that the mobile device is capable of displaying the landing page referenced by the selected ad comprises determining, based on the processing capability, whether the landing page can be transcoded for presentation on the mobile device.

23. A computer storage medium encoded with a computer program, the program comprising instructions that when executed by one or more computers cause the one or more computers to perform operations comprising:
receiving a request from a mobile device;
identifying, based on the request, a processing capability associated with the mobile device;
selecting an ad that includes a reference to a landing page;
examining content of the landing page;
determining, based on the processing capability and based on the examined content, that the mobile device is capable of displaying the landing page referenced by the selected ad; and
in response to determining that the mobile device is capable of displaying the landing page referenced by the selected ad, serving the selected ad to the mobile device.

24. The computer storage medium of claim 23, the operations further comprising:
determining, based on the processing capability, that the mobile device is capable of displaying a linked page referenced by the landing page,
wherein serving the selected ad for presentation on the mobile device is in response to determining, based on the processing capability, that the mobile device is capable of displaying the linked page referenced by the landing page.

25. The computer storage medium of claim 23, wherein determining, based on the processing capability, that the mobile device is capable of displaying the landing page referenced by the selected ad includes determining whether the landing page includes Flash content.

26. The computer storage medium of claim 23, wherein determining, based on the processing capability, that the mobile device is capable of displaying the landing page referenced by the selected ad includes determining whether the landing page includes Javascript content.

27. The computer storage medium of claim 23, wherein determining, based on the processing capability, that the mobile device is capable of displaying the landing page referenced by the selected ad includes determining whether the landing page includes content accessed through a secure hypertext transfer protocol.

28. A method comprising:
receiving, by a server system, a request from a mobile device;
identifying, by the server system and based on the request, a processing capability associated with the mobile device;
selecting, by the server system, an ad that includes a reference to a landing page;
determining, by the server system, whether the landing page includes Javascript content or content accessed through a secure hypertext transfer protocol, determining, by the server system and based on the processing capability, that the mobile device is capable of displaying the landing page referenced by the selected ad; and in response to determining that the mobile device is capable of displaying the landing page referenced by the selected ad, serving, by the server system, the selected ad to the mobile device.

* * * * *